(12) United States Patent
Robak et al.

(10) Patent No.: US 12,005,823 B2
(45) Date of Patent: Jun. 11, 2024

(54) DUMPING SYSTEM FOR DELIVERY OF AGGREGATE TO A RAILROAD TRACK OR ROADWAY

(71) Applicant: R & S Track Maintenance, Inc., Ashland, NE (US)

(72) Inventors: Mark Robak, Columbus, NE (US); Tim Starostka, Ashland, NE (US)

(73) Assignee: R & S Track Maintenance, Inc., Ashland, NE (US)

( * ) Notice: Subject to any disclaimer, the term of this patent is extended or adjusted under 35 U.S.C. 154(b) by 889 days.

(21) Appl. No.: 17/010,543

(22) Filed: Sep. 2, 2020

(65) Prior Publication Data

US 2021/0070209 A1    Mar. 11, 2021

Related U.S. Application Data

(63) Continuation-in-part of application No. 16/566,180, filed on Sep. 10, 2019.

(51) Int. Cl.
*B60P 1/28* (2006.01)
*G05D 1/00* (2006.01)

(52) U.S. Cl.
CPC ............ *B60P 1/283* (2013.01); *G05D 1/0016* (2013.01)

(58) Field of Classification Search
CPC .......... B60P 1/283; B60P 1/26; G05D 1/0016; E01B 27/02; E01B 2203/06; E01B 2203/16
See application file for complete search history.

(56) References Cited

U.S. PATENT DOCUMENTS

| | | | | |
|---|---|---|---|---|
| 2,989,930 A * | 6/1961 | Flowers | ................ | E01B 27/022 239/665 |
| 4,838,598 A * | 6/1989 | Hyde | ........................ | B60P 1/26 222/561 |
| 5,359,942 A * | 11/1994 | Ward | ....................... | B61D 7/30 105/241.2 |
| 5,657,700 A * | 8/1997 | Bounds | ..................... | B61D 7/30 104/2 |
| 7,980,636 B2 * | 7/2011 | Miller | ....................... | B60P 1/56 298/29 |
| 2005/0278982 A1 * | 12/2005 | Herzog | ................... | E01B 27/02 37/104 |

OTHER PUBLICATIONS

R & S Track Maintenance, Inc. Manual Dumping Gates, Sep. 9, 2018.

* cited by examiner

*Primary Examiner* — Robert J McCarry, Jr.

(57) ABSTRACT

A dumping system for accurate and precise dumping of ballast rock, sand, and gravel (aggregate) to all areas of a railroad track (a track), all areas of a roadway, and all regions of the roadway is described. The dumping system includes a dump box, a dump gate having at least two delivery gates, an operating system, and a control system. The at least two delivery gates of the dump gate each include a top portion and a bottom portion. The bottom portion of each of the at least two delivery gates is adjusted in real time by the operating system via the control system to accurately and precisely deliver the aggregate to all areas of the track or roadway. The dump box may further be rotated horizontally and vertically to aid with the delivery of aggregate to the track or roadway in an accurate manner.

16 Claims, 11 Drawing Sheets

DUMPING SYSTEM FOR DELIVERY OF AGGREGATE TO A RAILROAD TRACK OR ROADWAY

BACKGROUND

New construction and proper maintenance of railroad tracks (a track) and roadways (i.e. gravel roads, water bound macadam roads, bituminous roads, concrete roads and the like) includes laying or replenishing aggregate (i.e. ballast rock, gravel, asphalt, and sand) that is degraded from the track or roadway. This degradation may be through normal wear and tear on the track or roadway, flooding, human intervention, and the like. Often the loss of aggregate on the track or roadway is not even, such that one track area (i.e. to the left of the rails, between the rails, and to the right of the rails) of the track experiences a greater loss of aggregate. Similarly, roadways often experience loss of aggregate unevenly, such that one roadway area (i.e. to the left side of the roadway, to the right side of the roadway, or the median) or portions within the roadway area experience a greater loss of aggregate. Further, in new construction of roadways, one roadway area, or roadway region (i.e. crest of the roadway, lane, and shoulder) or portions therein the roadway area or roadway region may require more or less aggregate than another roadway area. Additionally, different areas of track and different roadway areas and regions not in close proximity (e.g. portions of the track or roadway a number of kilometers (miles) apart) may have different aggregate delivery needs. The ability to deliver aggregate to the proper location (e.g. accuracy) in the correct amount (e.g. precision) to all track areas and roadway areas and regions is paramount to completing track maintenance and roadway construction and maintenance efficiently from both a time and materials (e.g. amount of aggregate used) standpoint.

Conventional apparatuses for dumping aggregate (e.g. ballast rock, gravel, and sand) for track maintenance include ballast cars and manual dumping gates. These conventional apparatus present practical limitations that do not provide the accuracy and precision of dumping to all track areas. For example, ballast cars provide delivery of aggregate with accuracy to one track area but may lack precision, given the amount of aggregate delivered to one track area at a time. Further ballast cars do not deliver aggregate to all track areas simultaneously as needed, as they are not equipped to dump ballast between the rails. Finally, the mode of transporting ballast cars is via the railroad track itself, so ballast cars lack a portability aspect in that to get to an area of track not in close proximity to its current area, it must travel via the railroad track to arrive at the proper location.

Further, the manual dumping gates provide for accurate dumping of ballast to the track, but do not allow for precise dumping. Additionally, manual dumping gates expose the individual operating the manual dumping gate to safety risks. These safety risks include inhalation of aggregate dust by proximity to the dumping aggregate, and the risk of being struck with aggregate causing physical injury, again by proximity to the dumping aggregate. The manual gates requires manually fixing the gate in an open position, where dumping continues at the rate of the selected open position. Modifying the dumping gate position requires either an individual to be positioned at the gate on the hi-rail equipment as it moves down the track, or halting the hi-rail equipment to which the manual dumping gate is attached, and then manually changing the open position to provide a different dumping rate.

If the gate position is modified by an individual being positioned on the hi-rail equipment as it moves, the individual is subject to increased safety risk associated with being unrestrained on a moving vehicle and being in close proximity to falling aggregate. While positing an individual on the hi-rail vehicle does allow for some degree of precise dumping through real-time adjustment of the gate, this real-time adjustment is hindered by the vantage point of the individual controlling the gate being obstructed by falling aggregate and/or the hi-rail vehicle. This vantage point may make it difficult to ascertain the amount of aggregate needed by a particular track area. Moreover, manual real-time adjustment is hindered through the manual movement required for an individual to move the correct position on the gate and to actually adjust the gate.

If the gate position in modified by halting the hi-rail equipment the safety risks associated with falling aggregate and inhalation of debris remain. Moreover, halting the hi-rail equipment does not allow for real-time adjustment of the gate for precise delivery of aggregate to the railroad track. This may lead to some track areas receiving too much ballast, which cannot be corrected without further manual intervention. This may also lead to too little ballast on a particular track area, which is only corrected by going over that track area again, duplicating efforts.

Conventional apparatuses for dumping aggregate (e.g. ballast rock, gravel, and sand) for roadway construction and maintenance include conventional dump trucks. These conventional apparatus present practical limitations that do not provide the accuracy and precision of dumping to all roadway areas or regions, and may require use of road graders to further disperse aggregate in an accurate and precise manner. For example, dump trucks may provide delivery of aggregate with some accuracy to one roadway area or region by positioning the vehicle itself through steering, but lack enhanced accuracy as the aggregate leaves the width of the bed of the dump truck at the same rate. Further, a dump truck lacks precision in delivering aggregate as the rate of delivery is only modifiable through raising and lowering of the dump truck bed.

It is therefore desirable to have a dumping system that provides precise dumping of aggregate through real-time modifications to the rate of aggregate delivery to reduce waste of aggregate delivered to the track. It is further desirable for the dumping system to provide operation without close proximity of an individual to the dumping aggregate to enhance the safety of the dumping system. It is further desirable for the dumping system to have portability to be transported to a new area of track without using the railroad track.

SUMMARY

In one aspect of the invention a dumping system for accurate and precise delivery of aggregate to a roadway, the dumping system includes a dump box configured to hold aggregate; a dump gate, the dump gate comprising at least two delivery gates, each delivery gate having a top portion, a bottom portion, and a flange; and a frame, the frame in mechanical communication with each of the at least two delivery gates, and wherein the dump gate forms a fourth side of the dump box; an operating system configured to move the at least two delivery gates between an open, a partially open, and a closed position, the operating system comprising a pump configured to supply pressurized hydraulic fluid to the operating system, where the pump is in fluid communication with a pressure hose, the pressure hose, where the pressure hose is in fluid communication with a spool valve, a spool valve having at least two valves, at least two hydraulic cylinders, where each hydraulic cylinder is in mechanical communication with one of the at least two delivery gates, each of the at least two hydraulic cylinders having an extension hose and a retraction hose, wherein each extension hose and each retraction hose is in fluid communication with the one of the at least two valves of the spool valve, a return hose in fluid communication with the spool valve, and a tank in fluid communication with the return hose; and a control system configured to provided real time adjustment of the at least two delivery gates between the open, the partially open, and the closed positions, the control system comprising a wireless controller configured to transmit a signal to a signal receiver, a control unit having the signal receiver, the control unit in mechanical communication with the dump box, and control lines, the control lines in electric communication with the control unit and the at least two valves of the spool valve.

In another aspect of the invention a dumping system for accurate and precise delivery of aggregate to a roadway, the dumping system including a dump box configured to hold aggregate; a dump gate, the dump gate comprising a means for delivering aggregate to the roadway in an accurate and precise manner, wherein the dump gate forms a fourth side of the dump box; an operating system configured to operate the means, the operating system comprising a pump configured to supply pressurized hydraulic fluid to the operating system, where the pump is in fluid communication with a pressure hose, the pressure hose, where the pressure hose is in fluid communication with a spool valve, a spool valve having at least two valves, at least two hydraulic cylinders, where each hydraulic cylinder is in mechanical communication with the means, wherein each extension hose and each retraction hose is in fluid communication with the one of the at least two valves of the spool valve, a return hose in fluid communication with the spool valve, and a tank in fluid communication with the return hose; and a control system configured to provided real time adjustment of the means, the control system comprising a wireless controller configured to transmit a signal to a signal receiver, a control unit having the signal receiver, the control unit in mechanical communication with the dump box, and control lines, the control lines in electric communication with the control unit and the at least two valves of the spool valve.

In another aspect of the invention a dumping system for accurate and precise delivery of aggregate to a roadway track, the dumping system including a dump box configured to hold aggregate; a dump gate, the dump gate comprising at least three delivery gates, each delivery gate having a top portion, a bottom portion, and a flange, where each delivery gate is 0.66 meters in width; and a frame, the frame in mechanical communication with each of the at least three delivery gates, and wherein the dump gate forms a fourth side of the dump box; an operating system configured to move each of the at least three delivery gates between an open, a partially open, and a closed position, the operating system comprising a pump configured to supply pressurized hydraulic fluid to the operating system, where the pump in fluid communication with a pressure hose, the pressure hose, where the pressure hose is in fluid communication with a spool valve, a spool valve having at least three valves, at least three hydraulic cylinders, where each hydraulic cylinder is in mechanical communication with one of the at least three delivery gates, each of the at least three hydraulic cylinders having an extension hose and a retraction hose, wherein each extension hose and each retraction hose is in fluid communication with the one of the at least three valves of the spool valve, a return hose in fluid communication with the spool valve, and a tank in fluid communication with the return hose; and a control system configured to provided real time adjustment of the at least three delivery gates between the open, the partially open, and the closed positions, the control system comprising a wireless controller configured to transmit a signal to a signal receiver, a control unit having the signal receiver, the control unit in mechanical communication with the dump box, and control lines, the control lines in electric communication with the control unit and the at least three valves of the spool valve.

DETAILED DESCRIPTION

A dumping system for accurate and precise dumping of ballast rock, sand, and gravel (aggregate) to all areas of a railroad track (a track), roadway area, or roadway region is described. The dumping system includes a dump box, a dump gate having at least two delivery gates, an operating system, and a control system. The at least two delivery gates of the dump gate each include a top portion and a bottom portion. The bottom portion of each of the at least two delivery gates is adjusted in real time by the operating system via the control system to accurately and precisely deliver the aggregate to all areas of the track, roadway areas, and roadway regions. The dump box may further be rotated horizontally and vertically to aid with the delivery of aggregate to the track or roadway in an accurate and precise manner.

Figure 1:
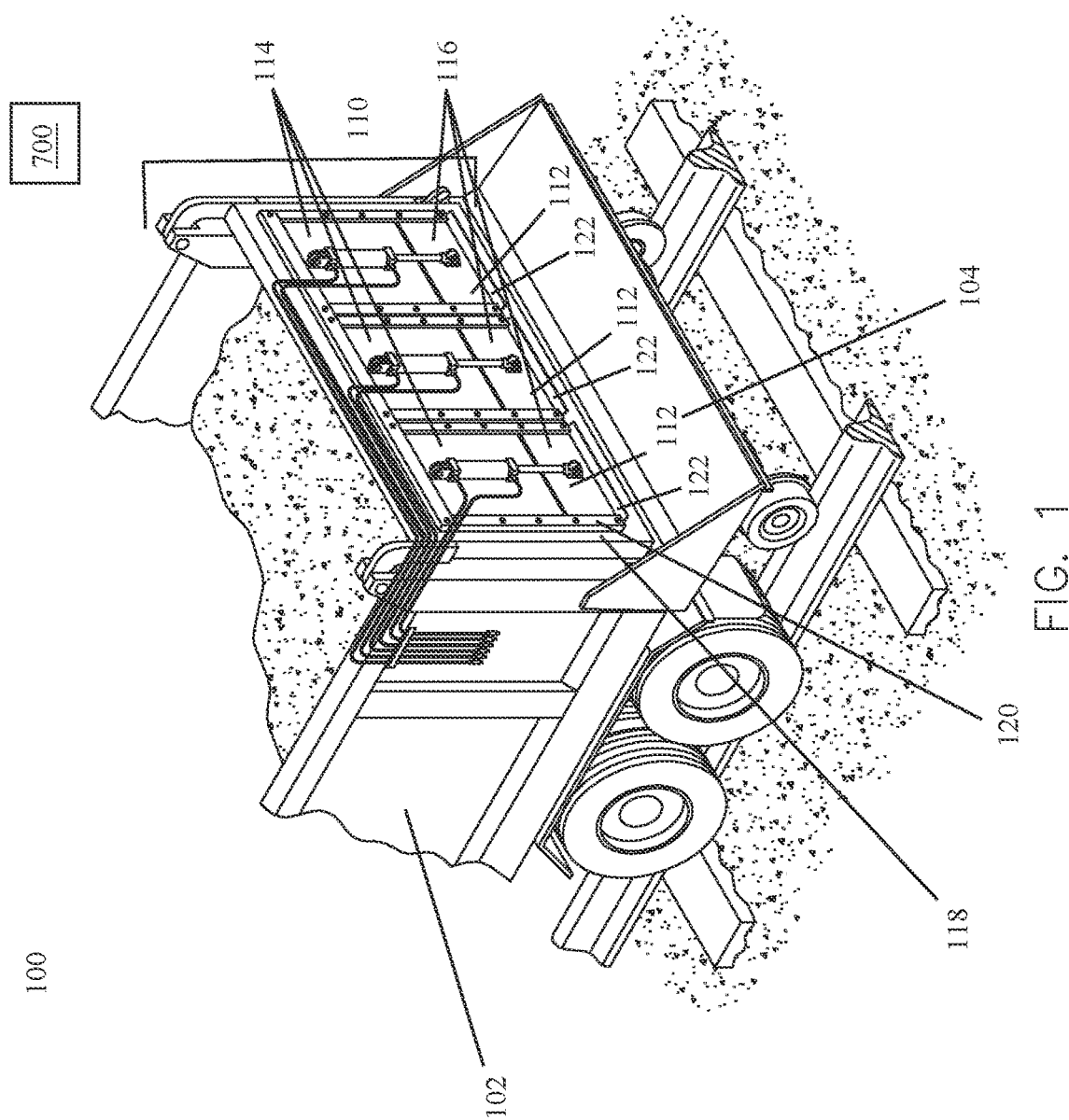
FIG. 1 is a perspective view of a dumping system.

FIG. 1 is a perspective view of the dumping system 100 having a dump box 102, a dump gate 110, an operating system 200 and a control system 700. The dumping system 100 is configured for use with a hi-rail vehicle 300 (i.e. a vehicle adapted for use on a railroad track). While any hi-rail vehicle may be used, the figures of this application show the dumping system 100 used in connection with a hi-rail flatbed track. The dumping system 100 may also be configured for use on a roadway vehicle 400 (i.e. a vehicle adapted for use on a roadway). While any roadway vehicle may be used, the figures (FIGS. 11 and 12) of this application show the dumping system 100 used in connection with a flat bad truck.

The dump box 102 is configured hold aggregate for delivery to a track or roadway via the gate 110. The dump box 102 is in mechanical communication with the hi-rail vehicle 300. The dump box 102 may be three sided where the dump gate 110 forms the fourth side of the dump box 102 at the rear of the hi-rail vehicle 300 or roadway vehicle 400. The dump box 102 is constructed from any material capable of withstanding the force of the aggregate when the dump box 102 is full, such as metal, metal alloys, and the like.

The dump box 102 may include an extender 104 configured to move aggregate away from the hi-rail vehicle 300, or roadway vehicle 400, when dumping aggregate on the track or roadway, respectively. The extender 104 extends straight from the rear of the hi-rail vehicle 300 or roadway vehicle 400 at the bottom of the dump gate 102, past the wheels of the hi-rail vehicle 300 or roadway vehicle 400, such as from 0.5 to 2 meters. The extender 104 keeps aggregate from falling into the wheels or other machinery of the hi-rail vehicle 300 or roadway vehicle 400.

The dump gate 110 of the dumping system 100 provides a means for delivering aggregate to the rail or roadway in a precise and accurate manner. The dump gate 110 includes at least two delivery gates 112 and a frame 118. Preferably, the dump gate 110 includes three delivery gates 112 (as shown in FIG. 1).

The at least two delivery gates 112 provide for accurate delivery to all track and roadway areas and all roadway regions. The at least two delivery gates 112 are arranged side-by-side and extend substantially the width of the dump gate 110, where each delivery gate 112 is substantially equal or equal in width. For example, when the dump gate 110 includes three delivery gates, each of the three delivery gates are from 0.46 to 0.91 meters (1.5 to 3 feet) in width. Each of the at least two dump gates 112 opens vertically. Each delivery gate of the at least two delivery gates 112 include a top portion 114, a bottom portion 116, and a flange 120. Each gate of the at least two delivery gates 112 may include a brim 122.

The top portion 114 of each of the at least two delivery gates permits the attachment of one of each of the at least two hydraulic cylinders 202 of the operating system 200. The top portion 114 may be from 0.46 to 0.91 meters (1.5 to 3 feet) in height. The top portion remains stationary when the dump system 100 is in use. The top portion 114 is made from a material capable of withstanding the aggregate when the dump box 102 is full, such as from at least 0.91 centimeters (⅜ inch) thick metal, metal alloys, and the like.

The bottom portion 116 of each of the at least two delivery gates 112 provides precise delivery of aggregate to an area of a railroad track through real-time adjustment of the rate of delivery of aggregate to the track or roadway. The bottom portion 116 provides an attachment point for a rod 216 of one of the at least two hydraulic cylinders 202 of the operating system. The bottom portion 116 is from 0.23 to 0.69 meters (0.75 to 2.25 feet) in height. The bottom portion 116 is made from a material capable of withstanding the aggregate when the dump box 102 is full, such as from at least 0.91 centimeters (⅜ inch) thick metal, metal alloys, or the like. When adjusted upward and downward the bottom portion modifies the rate of delivery of aggregate to the track or roadway. When the bottom portion is fully down (i.e. delivery gate 112 is in a closed position) the bottom portion prohibits delivery of aggregate to the track or roadway. When the bottom portion is fully up (i.e. delivery gate 112 is in a fully open position) or partially up (i.e. delivery gate 112 is partially open) the bottom portion permits delivery of aggregate to the track or roadway.

The flange 120 of each of the at least two delivery gates 112 receives edges of the top portion 114 and the bottom portion 116. The flange 120 extends along each vertical side and the top of one of the at least two delivery gates 112. The flange 120 is a depth to accommodate the width of both the top portion 114 and the bottom portion 116, such that the edges of both the top portion 114 and bottom portion 116 are received within the flange 120 when the bottom portion 116 is in any position, such as from at least 1.9 centimeters (¾ inch). The flange 120 is in mechanical communication with the frame 118, such as through a weld, rivets, or the like. The flange 120 is in mechanical communication with a top edge of the top portion 114, such as through a weld, rivets, bolts or the like. The flange 120 is in sliding communication with the bottom portion 116. The flange 120 may be formed from the frame 118.

The brim 122 of each of the at least two delivery gates 112 facilitates the bottom portion 116 remaining in a closed position without damage by the aggregate. The brim 122 extends from each bottom of the at least two delivery gates 112 from 2.54 to 30.48 centimeters (1 to 12 inches). Each brim 122 is in mechanical communication with the frame 118. Each brim 122 may be formed as part of the frame 118.

The frame 118 of the dump gate 110 may surround the perimeter of each of the at least two dump gates 112. The frame 118 is made from a material capable of withstanding the aggregate when the dump box 102 is full, such as from at least 0.91 centimeters (⅜ inch) thick metal, metal alloys, or the like. The frame 118 of the dump gate 110 may include removably attached wings, where each wing extends outward at a diagonal angle from one of the at least two delivery gates 112. The removably attached wings provide further delivery accuracy for delivery of aggregate to an area of the track, roadway area, or roadway region. The removably attached wings may be rectangular and are made of a material that can withstand falling aggregate, such as metal, metal alloys, or the like.

Figure 2:
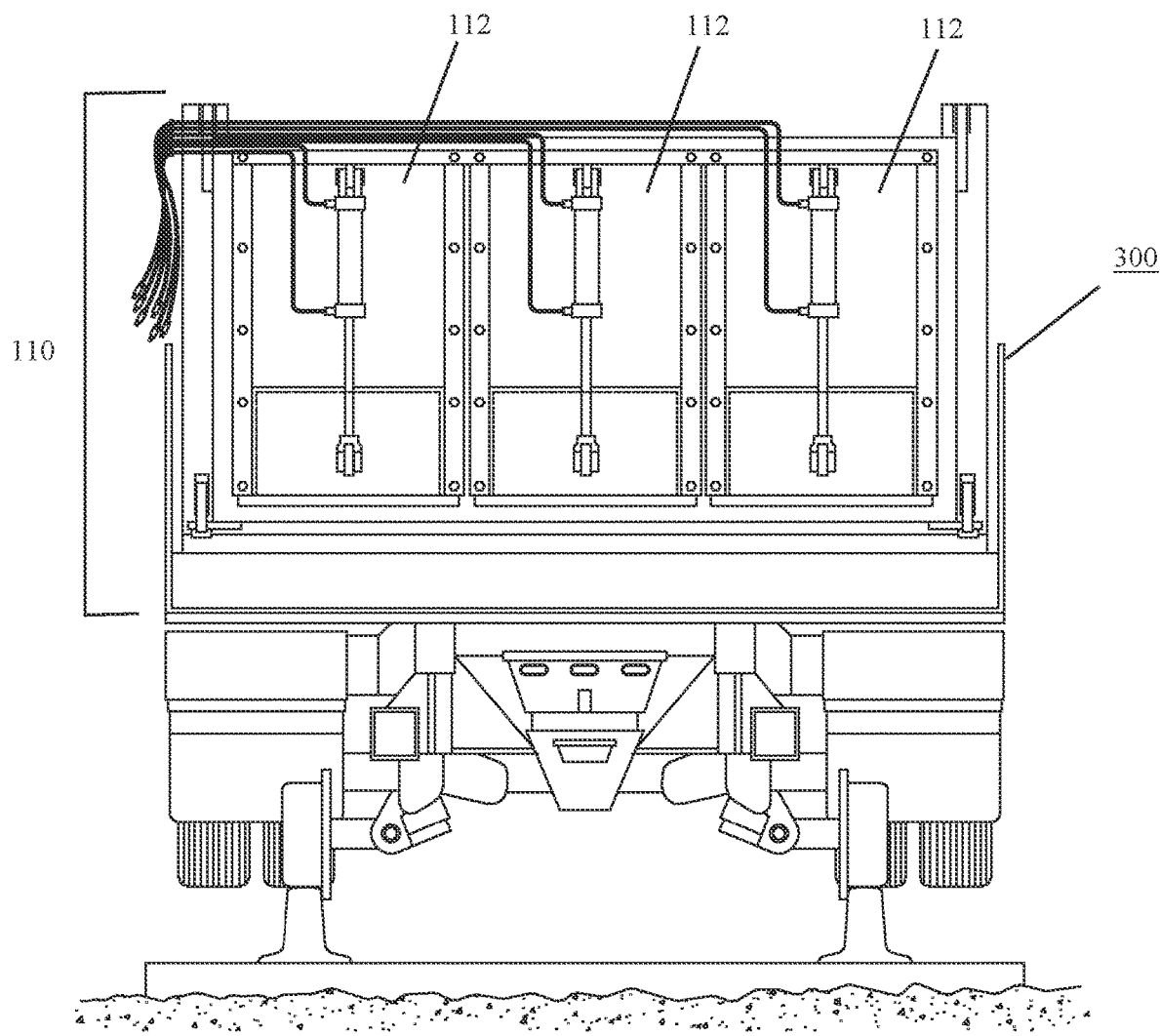
FIG. 2 is a rear view of a dump gate having three delivery gates.
Figure 3:
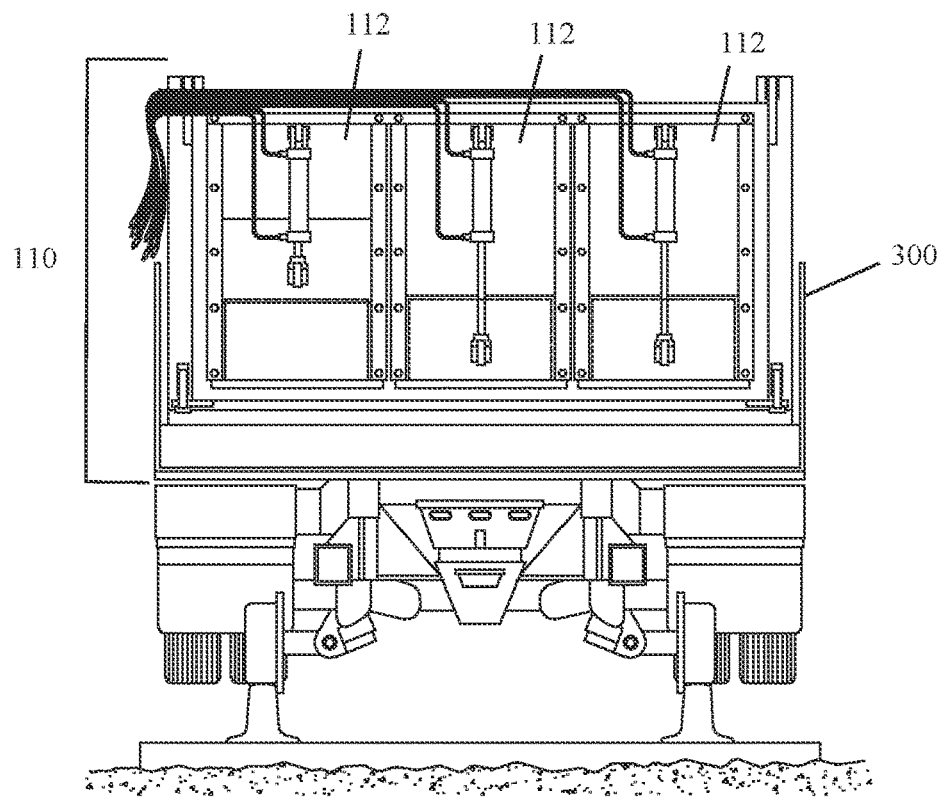
FIG. 3 is the rear view of the dump gate having three delivery gates displaying the delivery gates in closed and fully open positions.

FIG. 2 is a rear view of a dump gate 110 of a dumping system 100 having three delivery gates 112. The dump gate 110 of the dumping system 100 of FIG. 2 includes three delivery gates 112, where each of the three delivery gates 112 are in a closed position. FIG. 3 is a rear view of the dumping system 100 having three delivery gates 112, where one of the delivery gates 112 (a first delivery gate 112) is in a fully open position, and two delivery gates 112 are in the closed position (a second delivery gate 112 and a third delivery gate 112). In the fully open position aggregate is delivered to the track or roadway at a rate faster than a partially open delivery gate. While FIG. 3 shows the dumping system 100 in use with a hi-rail vehicle, the dumping system represented in FIG. 3 may be used in connection with a roadway vehicle 400.

Figure 4:
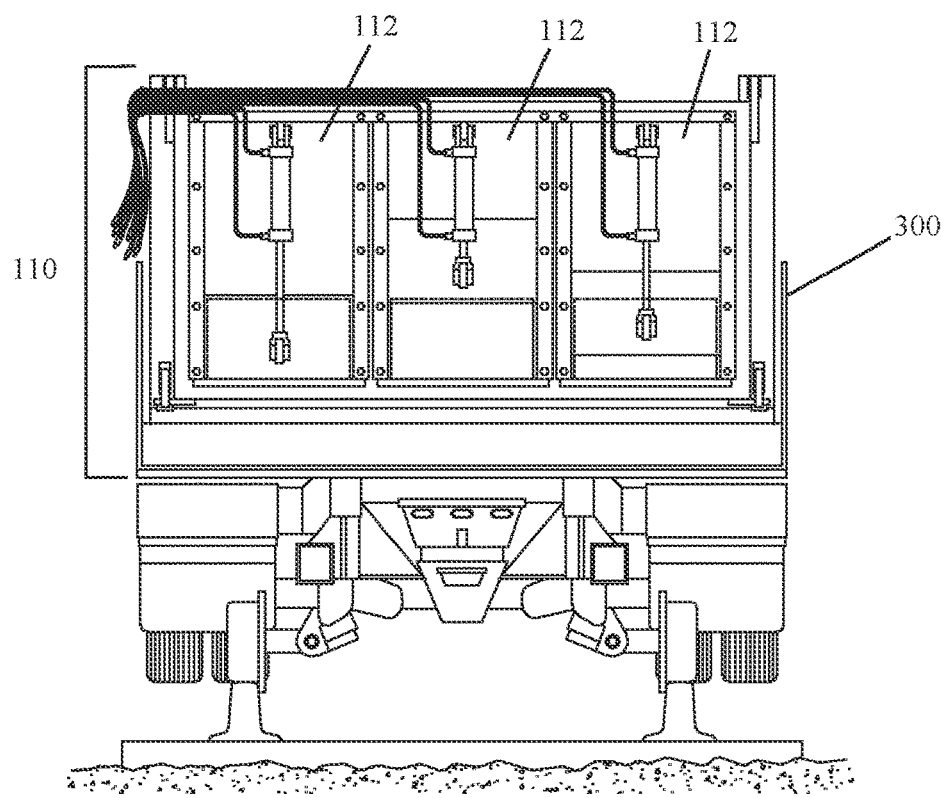
FIG. 4 is the rear view of the dump gate system having three delivery gates displaying the delivery gates in closed, fully open, and partially open positions.

FIG. 4 is a rear view of the dumping system 100 having three delivery gates 112, where the first delivery gate 112 is in the fully closed position, the second delivery gate 112 is in the fully open position, and the third delivery gate 112 is in a partially open position. The partially open position permits delivery of aggregate to the track or roadway at a slower rate than the fully open position. The partially open position may be any position, other than the closed position or fully open position. While FIG. 4 shows the dumping system 100 in use with a hi-rail vehicle, the dumping system represented in FIG. 4 may be used in connection with a roadway vehicle 400.

Figure 5:
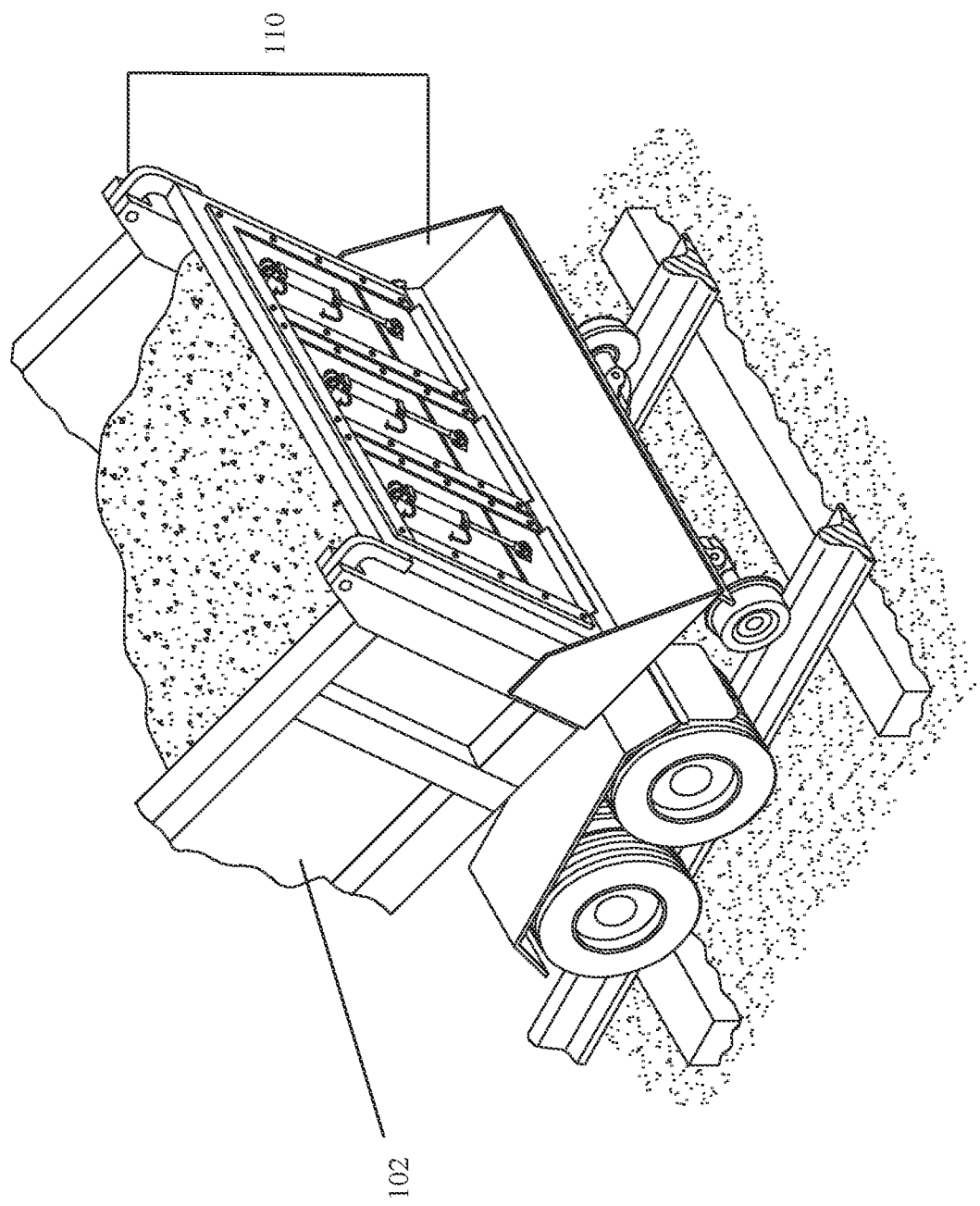
FIG. 5 is a second perspective view of a dumping system with a dump box rotated vertically.

FIG. 5 is a second perspective view of a dumping system with a dump box 102 rotated vertically. The dumping system 100 of FIG. 5 includes a dump gate 110 having three delivery gates 112. Each of the three delivery gates 112 are in the closed position. The dump box 102 is rotated in a vertical position, which facilitates movement of aggregate towards the dump gate 110 during use of delivering aggregate to the track or roadway. While FIG. 5 shows the dumping system 100 in use with a hi-rail vehicle, the dumping system represented in FIG. 5 may be used in connection with a roadway vehicle 400.

Figure 11:
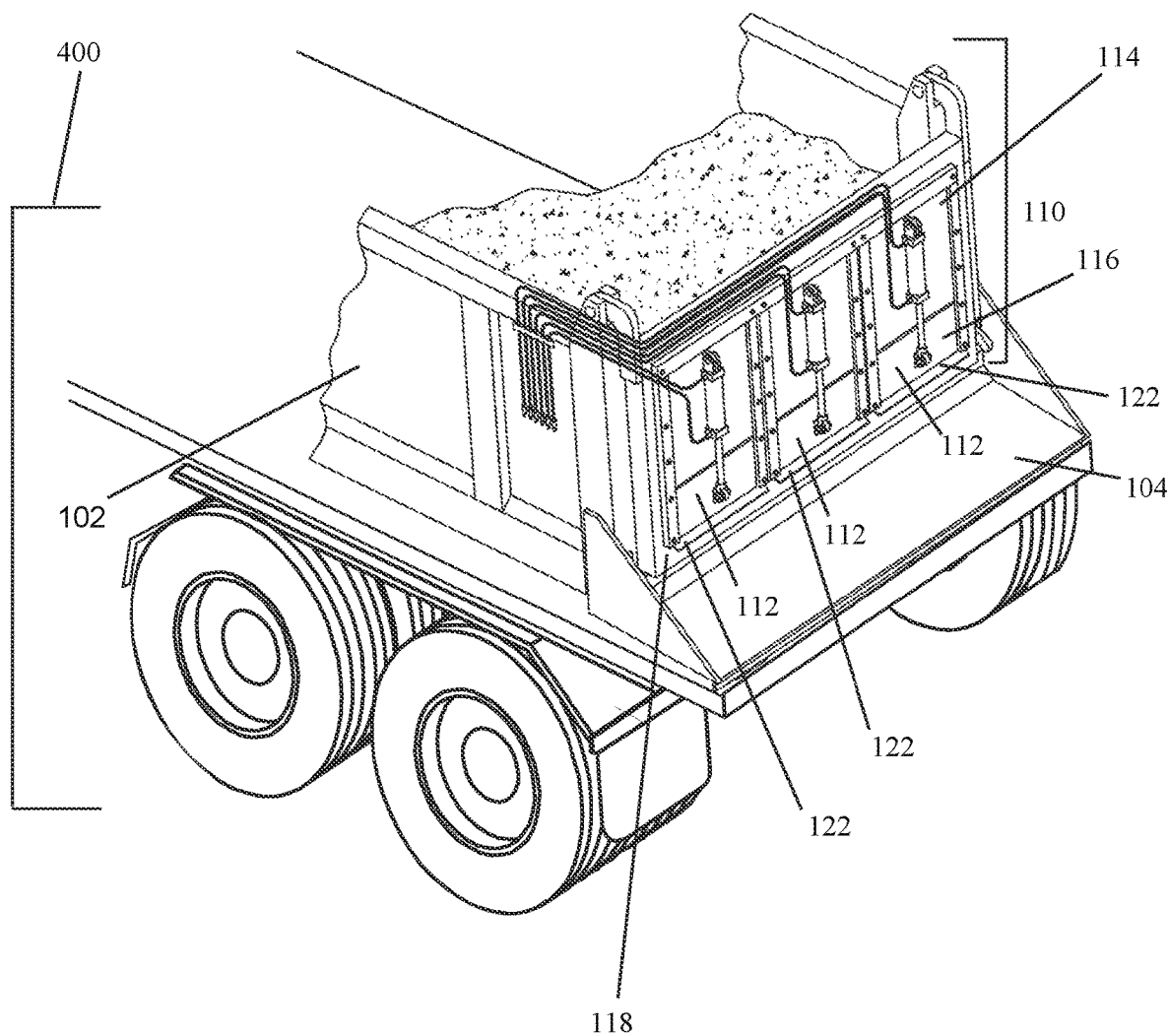
FIG. 11 represents a third perspective view of the dumping system configured for use on a roadway vehicle.

FIG. 11 represents a third perspective view of a dumping system 100 having three delivery gates 112. The dump gate 110 of the dumping system 100 of FIG. 11 includes three delivery gates 112, where each of the three delivery gates 112 are in a closed position. The dumping system 100 of FIG. 11 is used in connection with a roadway vehicle 400. The dumping system 100 in use with the roadway vehicle 400 provides accurate and precise delivery of aggregate to a roadway. For example, the vehicle may be positioned on the roadway under maintenance or new construction to deliver aggregate, and the dumping system through use of the at least two delivery gates 112 and vertical rotation of the dump box 102 provide precise delivery of aggregate, and horizontal rotation of the dump box 102 provides accurate delivery of the aggregate to the desired portion of the roadway area or roadway region.

Figure 12:
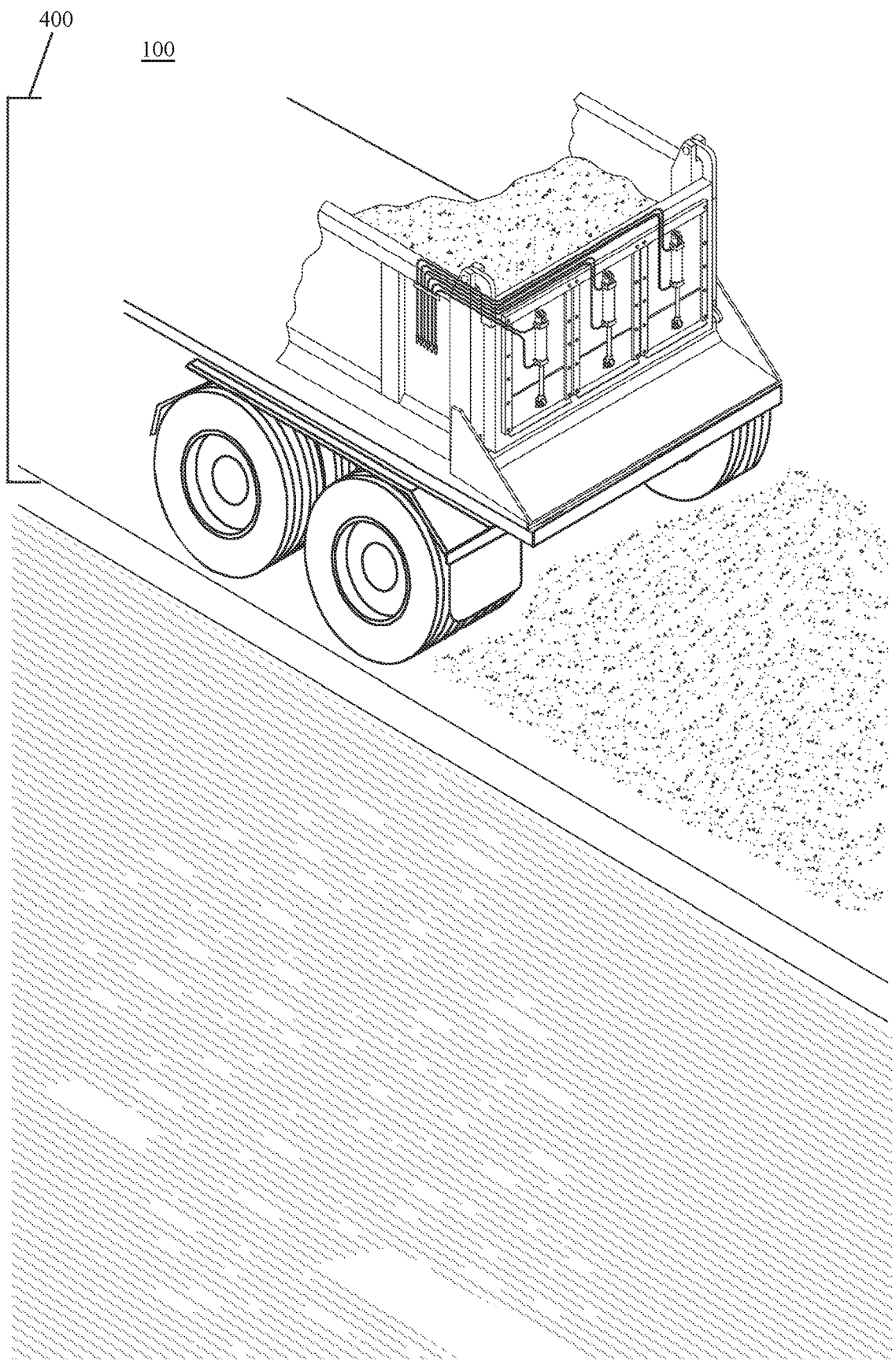
FIG. 12 represents a fourth perspective view of the dumping system in use on a roadway.

FIG. 12 represents a fourth perspective view of a dumping system 100 having three delivery gates 112 as used in connection with a roadway and a roadway vehicle 400. The dump gate 110 of the dumping system 100 of FIG. 12 includes three delivery gates 112, where each of the three delivery gates 112 are in a closed position. As shown in FIG. 12, the roadway vehicle is positioned in a roadway area to the right of the roadway to deliver aggregate to the shoulder roadway region.

Figure 9:
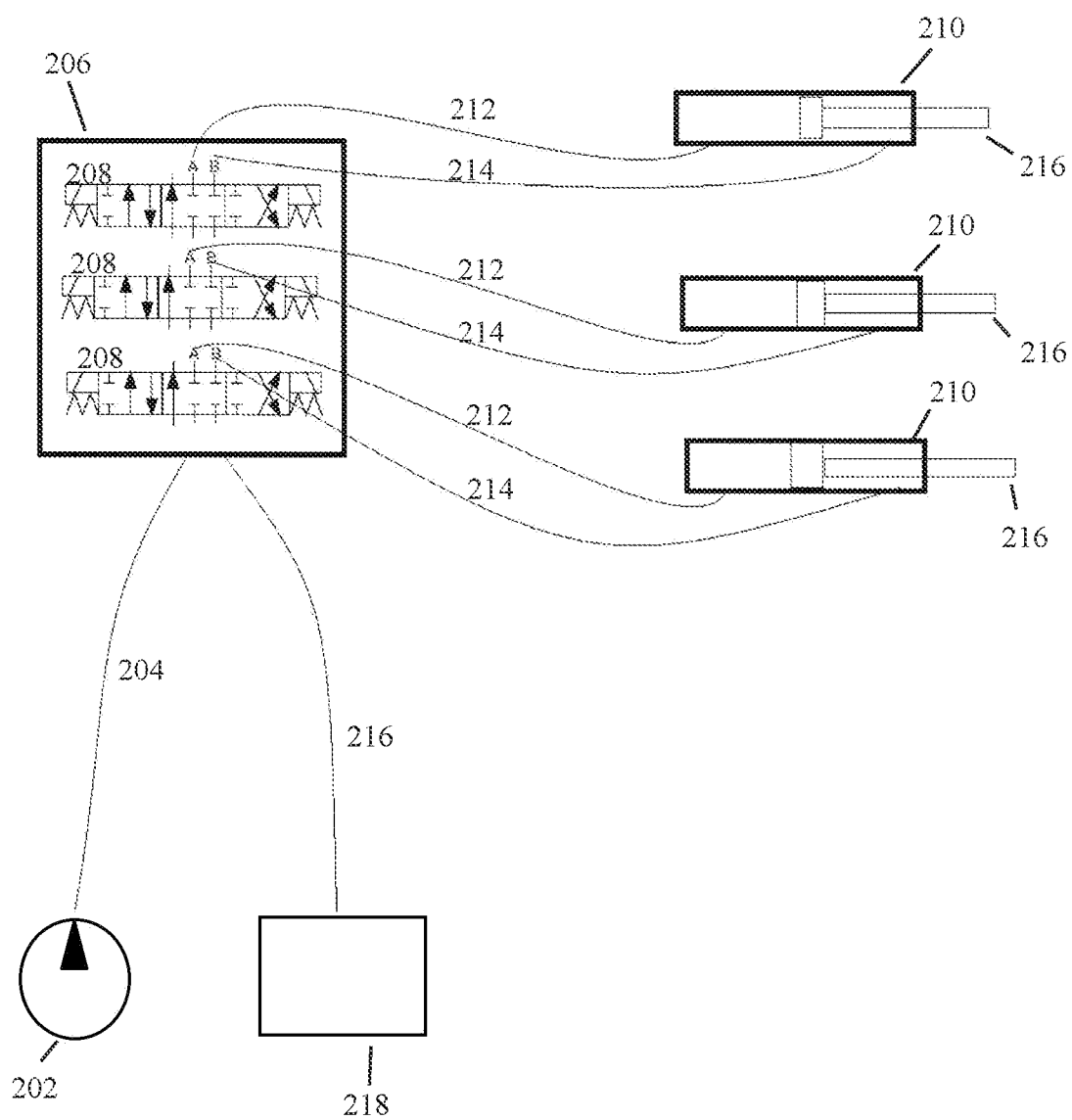
FIG. 9 represents an operating system of the dumping system.

FIG. 9 represents an operating system 200 of the dumping system 100. The operating system 200 is configured to supply hydraulic power to the dump gate 110 to move, in real time, each of the at least two delivery gates 112 between closed, fully open, and partially open positions via upward and downward movement of each bottom portion 116. The operating system 200 includes a pump 202, a pressure hose 204, a spool valve 206, at least two hydraulic cylinders 210, a return hose 216, and a tank 218. The operating system 200 may be equipped to the hi-rail vehicle 300 or the roadway vehicle 400. The pump 202 supplies pressurized fluid to the pressure hose 204. The pressure hose 204 supplies pressurized fluid to the spool valve 206. The pump 202, pressure hose 204, and spool valve 206 are in fluid communication.

Figure 6:
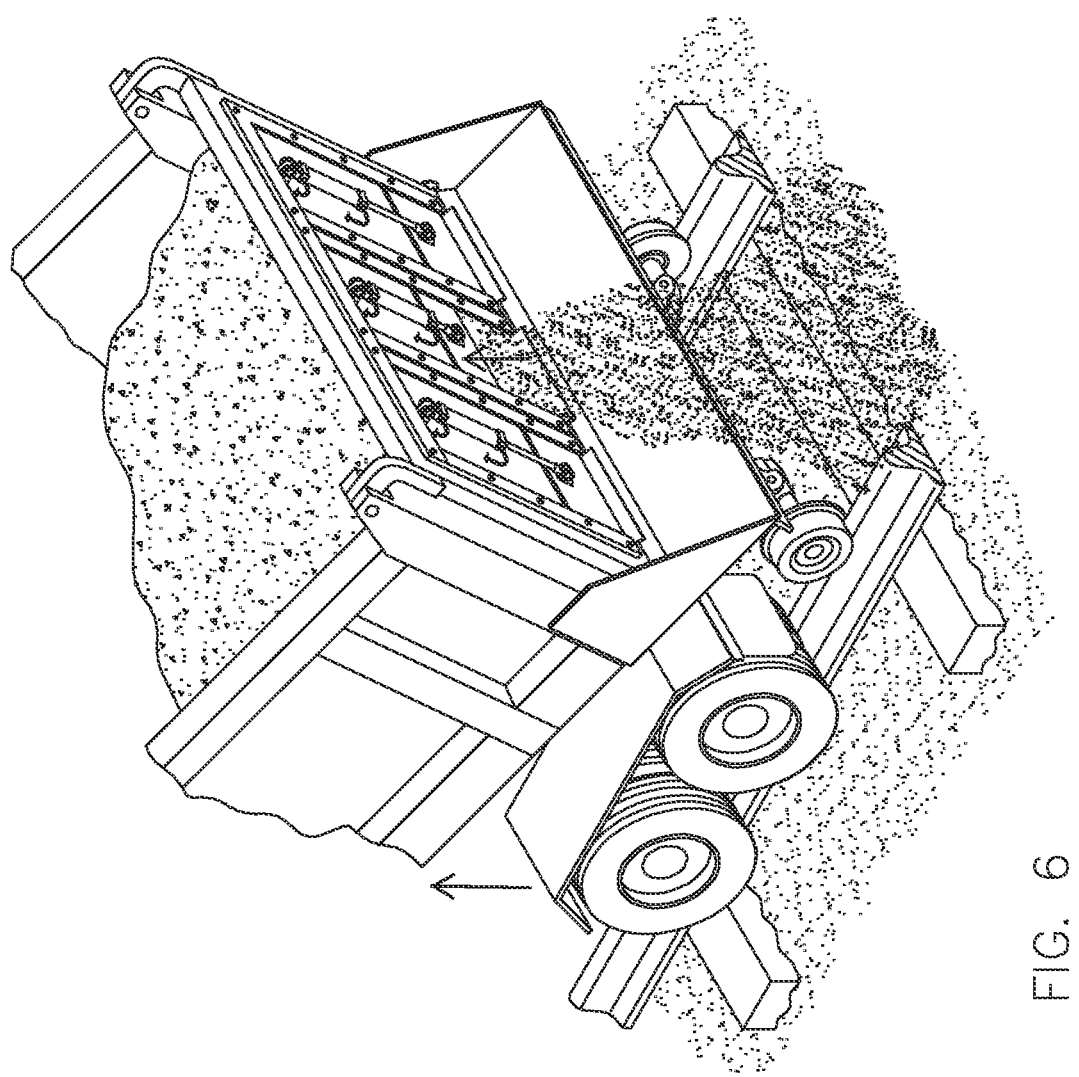
FIG. 6 represents a method for delivery of aggregate to a track using the dumping system.

The spool valve 206 includes at least two valves 208, where the number of valves 208 directly corresponds to the number of the at least two hydraulic cylinders 210. Each of the at least two valves 208 are four port, three position valves to supply pressurized fluid to the at least two hydraulic cylinders 210 to provide extension, retraction, and stasis of the at least two hydraulic cylinders 210. In FIG. 6, a spool valve 206 having three spools 208 is shown.

Each of the at least two hydraulic cylinders 210 moves each bottom portion 116 upward and downward to move each of the at least two delivery gates 112 between the closed, fully open, and partially open positions. The number of the at least two hydraulic cylinders 210 directly corresponds to the number of the at least two delivery gates 112.

In FIG. 6 three hydraulic cylinders 210 are shown. The at least two hydraulic cylinders 210 each include an extension hose 212, a retraction hose 214, and a rod 216. The at least two hydraulic cylinders 210 are in fluid communication with the spool valve 206.

When the rod 216 of one of the at least two hydraulic cylinders 210 is extended, the extension hose 212 receives pressurized fluid from the corresponding spool 208 of the spool valve 206 and supplies the pressurized fluid to one of the at least two hydraulic cylinders 210 to extend the rod 216. Extension of the rod 216 moves the bottom portion 116 of the delivery gate 112 downward to a partially open or closed position. Simultaneously during extension, the retraction hose 214 of the one of the at least two hydraulic cylinders 212 receives pressurized fluid from the one of the at least two hydraulic cylinders 210 for return to the corresponding spool 208, where the pressurized fluid moves to the return hose 216, and the tank 218. The spool valve 206, return hose 216, and the tank 218 are in fluid communication.

When the rod 216 is retracted, the retraction hose 214 receives pressurized fluid from the corresponding spool 208 of the spool valve 206 and supplies the pressurized fluid to one of the at least two hydraulic cylinders 210 to retract the rod 216, which moves the bottom portion 116 of the delivery gate 112 upward to a partially open or fully open position. Simultaneously, during retraction, the extension hose 212 receives pressurized fluid from the one of the at least two hydraulic cylinders 210 for return to the corresponding spool 208, where the pressurized fluid moves to the return hose 216, and the tank 218.

When the rod 216 is in a stasis position (i.e. the rod 216 remains stationary) the corresponding spool 208 does not deliver pressurized fluid to either the extension hose 212 or the retraction hose 214, rather pressurized fluid remains in each of the extension hose 212, the retraction hose 214 and the corresponding hydraulic cylinder of the at least two hydraulic cylinders 210, such that the rod 216 remains in stasis at any of the closed, fully open, or partially open positions.

Figure 10:
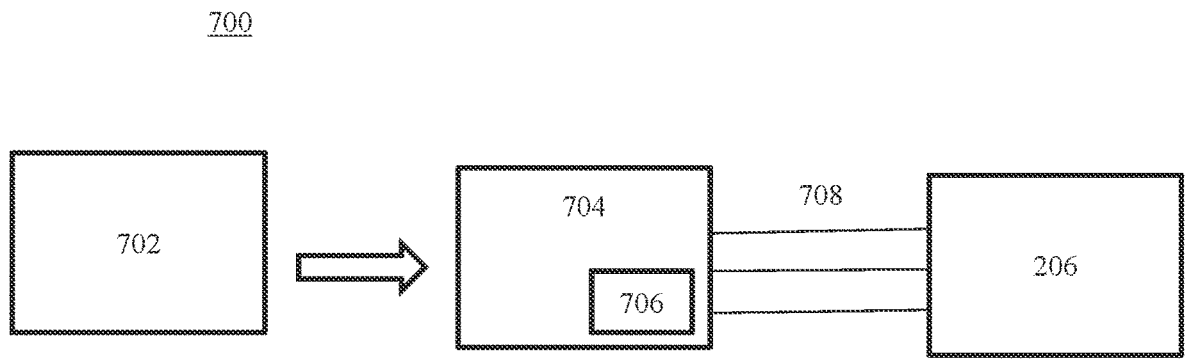
FIG. 10 represents a control system of the dumping system.

FIG. 10 represents a control system 700 of the dumping system 100 that provides real time adjustment of the positions of the bottom portions 116 of the at least two delivery gates 112 to modify the delivery of aggregate to the track or roadway for accurate and precise delivery of aggregate to all portions of the track, roadway areas, and roadway regions. The control system 700 includes a wireless controller 702, a control unit 704 having a signal receiver 706, and control lines 708. For example, the control system 700 may be a Trausch Dynamics digital wireless control, (6) function & double-pole, 7" pole type antenna, 200-1000 feet nominal range, 8 button remote.

The wireless controller 702 transmits a signal to the control unit 704. The wireless controller 702 may transmit a signal from a distance of 304.8 meters (1000 feet) or less from the control unit 704 allowing operation of the dumping system 100 at a distance safely away from the aggregate being delivered to the track or roadway. The control signal is received by the signal receiver 706 of the control unit 704. The control signal received by the signal receiver 706 of the control unit controls each valve 208 of the spool valve 206 via the control lines 708 to move the valves to positions corresponding to the extension, retraction, and stasis of a corresponding hydraulic cylinder 210 of the at least two hydraulic cylinders 210.

Figure 7:
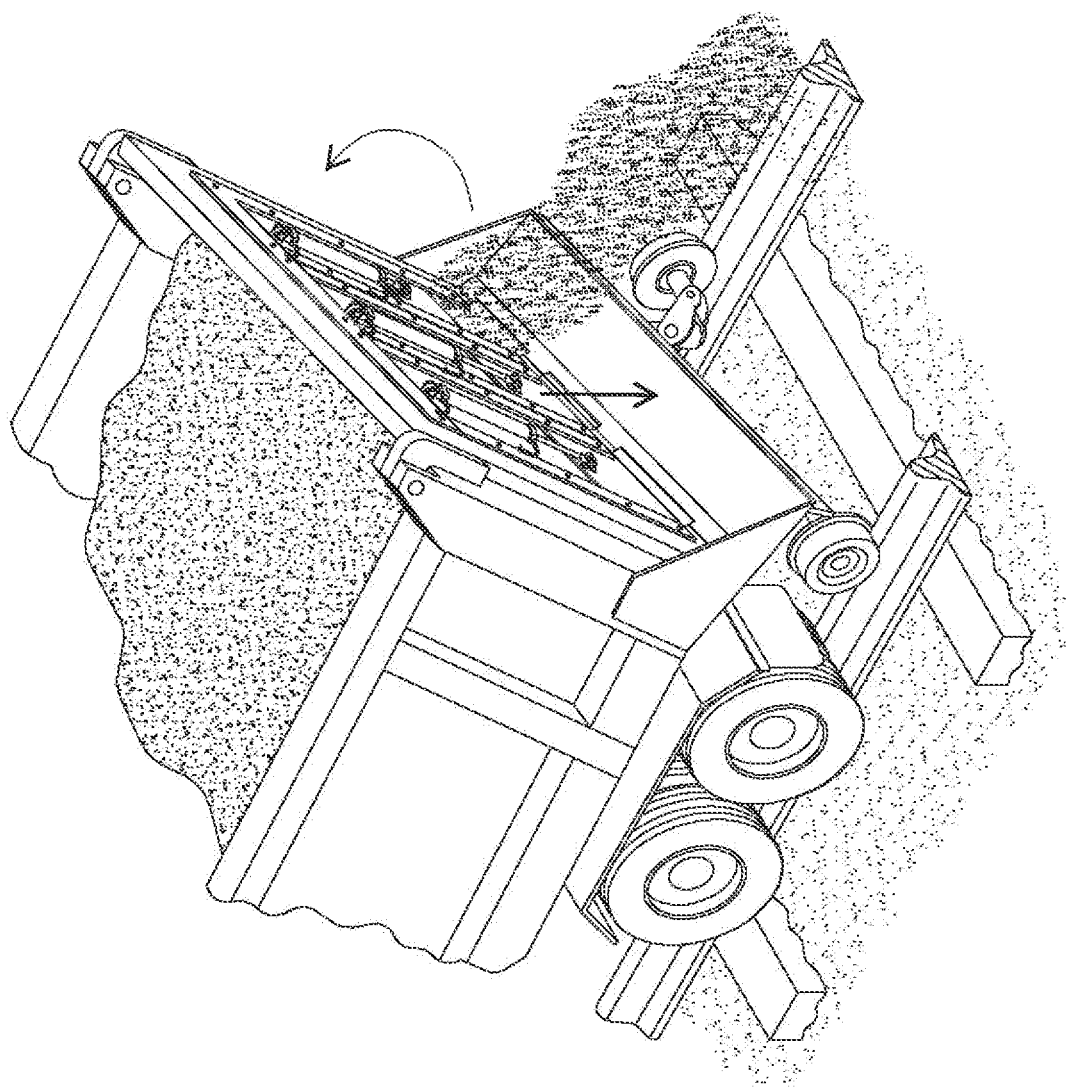
FIG. 7 represents the method for delivery of aggregate to a track using the dumping system.
Figure 8:
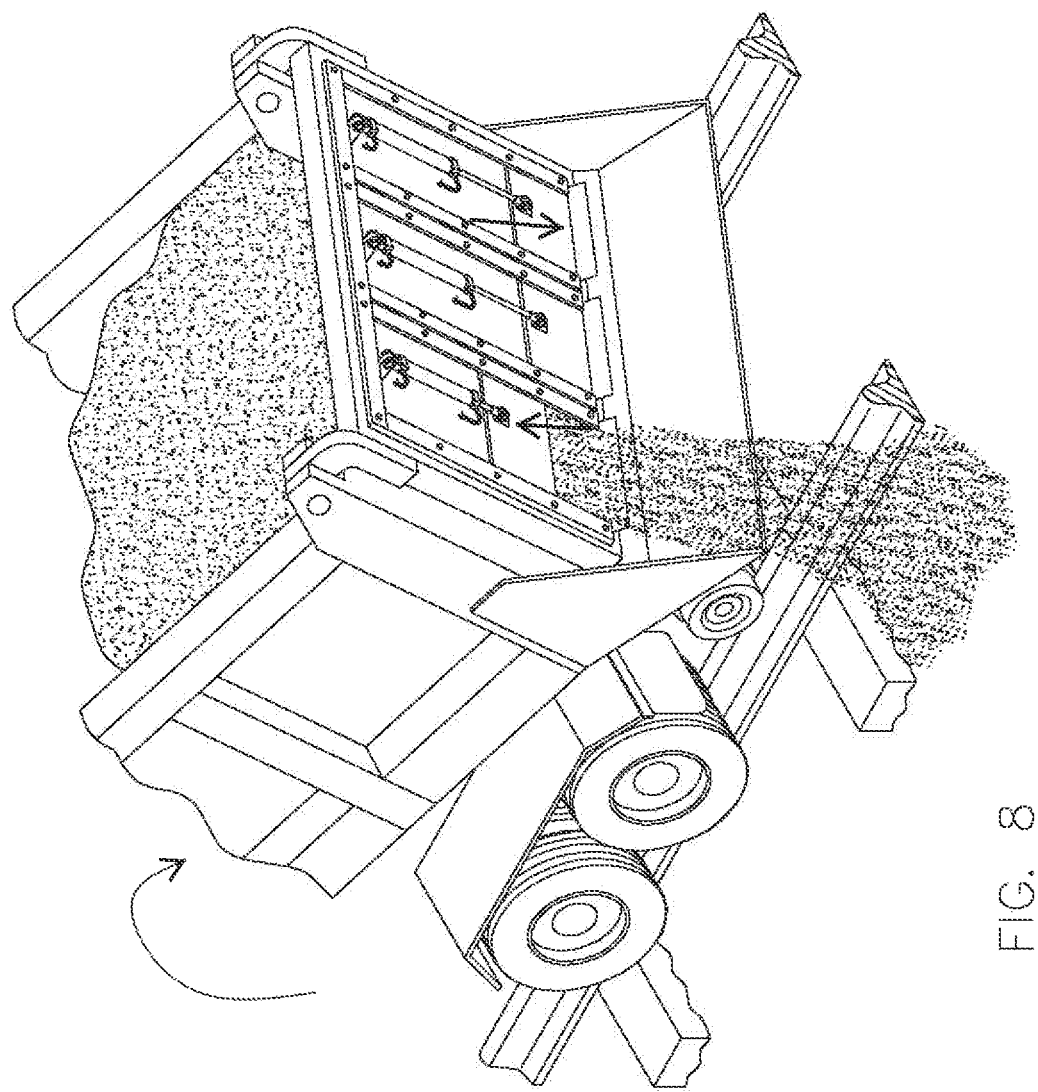
FIG. 8 represents the method for delivery of aggregate to a track using the dumping system.

FIGS. 6, 7, and 8 represent a method for delivering aggregate in an accurate and precise manner to all track areas, roadway areas, roadway regions using the dumping system 100. In this example, a dumping system 100 has three delivery gates 112. As the hi-rail vehicle 300 having the dumping system 100 moves along the track real-time determinations are made regarding the amount and location of delivery of aggregate to the track. The dump box 102 may be rotated upward to facilitate movement of the aggregate towards the dump gate 110 for delivery to the track. While FIGS. 6, 7, and 8 show the dumping system 100 used in connection with a method of delivery to a track in use with a hi-rail vehicle, the dumping system represented in FIGS. 6, 7, and 8 may be used in connection with a method of delivery to a roadway in use with a roadway vehicle 400.

Upon determination that for (i) a first portion of the track an area of the track between the rails requires aggregate and the neither the area to the right or left of the track requires aggregate or (ii) a first roadway region aligned with the center of roadway vehicle's bed (e.g. a lane of the roadway), the wireless controller 702 is engaged to provide a signal to the control unit 704 to move the valve 208 of the spool valve 206 corresponding to a second (center) hydraulic cylinder 210 to provide retraction of the rod 216 of the center hydraulic cylinder 210 moving the bottom portion 116 upward.

Upon determination of the necessary rate of delivery of aggregate to the area of track between the rails or the first roadway region, the wireless controller 702 sends a signal to the control unit 704 to move the valve 208 of the spool 206 corresponding to the second hydraulic cylinder 210 to provide stasis of the rod 216. This renders the second delivery gate 112 in the desired fully open or partially open position. As shown in FIG. 6, the second delivery gate 112 is in the fully open position.

Upon a real-time determination that (i) a second portion of the track requires aggregate on the area to the right of the track and not to the area to the left of the track or between the track, or (ii) a second roadway region aligned with the right of roadway vehicle's bed and not to regions of the roadway (e.g. a shoulder of the roadway), the wireless controller 702 sends a signal to the control unit to move the valve 208 corresponding to the second hydraulic cylinder 208 to extend the rod 216 to move the bottom portion 116 downward, such that the second delivery gate 112 is in the closed position. Simultaneously, or nearly simultaneously, the wireless controller 702 sends a signal to the control unit 704 to move the valve 208 of the spool valve 206 corresponding to the third hydraulic cylinder 210 to a position to provide retraction of the rod 216 to move the bottom portion 116 upward.

Upon determination of the necessary rate of delivery of aggregate to the area of track to the right of the rails or the second roadway region, the wireless controller 702 sends a signal to the control unit 704 to move the valve 208 of the spool 206 corresponding to the third hydraulic cylinder 210 to provide stasis of the rod 216 to leave the bottom portion 116 of the right delivery gate 112 in the desired fully open or partially open position. As shown in FIG. 7 the third delivery gate 112 is fully open. Additionally, the dump box 112 may be rotated counter-clockwise on the hi-rail vehicle 300 as shown in FIG. 7.

Upon determination that (i) a third portion of the track requires aggregate on the area to the left of the track, and not to the area to the right of the track or between the track, or (ii) a third roadway region aligned with the left of roadway vehicle's bed and not other roadway regions (e.g. crown of the roadway or median), the wireless controller 702 sends a signal to the control unit to move the valve 208 corresponding to the third hydraulic cylinder 208 to extend the rod 216 to move the bottom portion 116 downward to the closed position. Simultaneously, or nearly simultaneously, the wireless controller 702 sends a signal to the control unit 704 to move the valve 208 of the spool valve 206 corresponding to the first hydraulic cylinder 210 to a position to provide retraction of the rod 216 to move the bottom portion 116 upward.

Upon determination of the necessary rate of delivery of aggregate to the area of track to the left of the rails or the third roadway region, the wireless controller 702 sends a signal to the control unit 704 to move the valve 208 of the spool 206 corresponding to the first hydraulic cylinder 210 to provide stasis of the rod 216 to leave the bottom portion 116 in the desired fully open or partially open position. As shown in FIG. 8, the first delivery gate 112 is in the fully open position. Additionally, the dump box 112 may be rotated clockwise on the hi-rail vehicle 300 or the roadway vehicle 400 as shown in FIG. 8.

The method may further include delivery of aggregate to two or more track areas or two or more roadway regions at the same time, where real time adjustments of the position of each delivery gate 112 may be made according to the above detailed control mechanisms.

The invention claimed is:
1. A dumping system for accurate and precise delivery of aggregate to a roadway, the dumping system comprising:
   a dump box configured to hold aggregate;
   a dump gate, the dump gate comprising
      at least two delivery gates, each delivery gate having a top portion, a bottom portion, and a flange; and
      a frame, the frame in mechanical communication with each of the at least two delivery gates, and wherein the dump gate forms a fourth side of the dump box;
   an operating system configured to move the at least two delivery gates between an open, a partially open, and a closed position, the operating system comprising
      a pump configured to supply pressurized hydraulic fluid to the operating system, where the pump is in fluid communication with a pressure hose,
      the pressure hose, where the pressure hose is in fluid communication with a spool valve,
      a spool valve having at least two valves,
      at least two hydraulic cylinders, where each hydraulic cylinder is in mechanical communication with one of the at least two delivery gates at an attachment to the top portion and an attachment to the bottom portion where the hydraulic cylinder moves the bottom portion of the delivery gate in a linear vertical manner, each of the at least two hydraulic cylinders having an extension hose and a retraction hose, wherein
      each extension hose and each retraction hose is in fluid communication with one of the at least two valves of the spool valve,
      a return hose in fluid communication with the spool valve, and
      a tank in fluid communication with the return hose; and
   a control system configured to provided real time adjustment of the at least two delivery gates between the open, the partially open, and the closed positions, the control system comprising
      a wireless controller configured to transmit a signal to a signal receiver,
      a control unit having the signal receiver, the control unit in mechanical communication with the dump box, and control lines, the control lines in electric communication with the control unit and the at least two valves of the spool valve.

2. The system of claim 1, wherein
the at least two delivery gates comprise a first delivery gate and a second delivery gate;
the spool valve comprises a first valve and a second valve; and
the at least two hydraulic cylinders comprise a first hydraulic cylinder and a second hydraulic cylinder.

3. The system of claim 1, wherein
the at least two delivery gates comprise a first delivery gate, a second delivery gate, and a third delivery gate;
the spool valve comprises a first valve, a second valve, and a third valve; and
the at least two hydraulic cylinders comprise a first hydraulic cylinder, a second hydraulic cylinder, and a third hydraulic cylinder.

4. The system of claim 3, wherein
the first delivery, the second delivery gate, and the third delivery gate are from 0.46 to 0.762 meters in width.

5. The system of claim 1, wherein
the bottom portion of each of the at least two delivery gates is from 0.23 to 0.69 meters in height.

6. The system of claim 1, wherein
the signal receiver of the control unit is configured to receive a signal from the wireless controller where the wireless controller is from 304.8 meters or less from the control unit.

7. The system of claim 1, wherein
the dumping system is used in connection with a roadway vehicle.

8. A dumping system for accurate and precise delivery of aggregate to a roadway, the dumping system comprising:
a dump box configured to hold aggregate;
a dump gate, the dump gate comprising
a means for delivering aggregate to the roadway in an accurate and precise manner, wherein the dump gate forms a fourth side of the dump box;
an operating system configured to operate the means, the operating system comprising
a pump configured to supply pressurized hydraulic fluid to the operating system, where the pump is in fluid communication with a pressure hose,
the pressure hose, where the pressure hose is in fluid communication with a spool valve,
a spool valve having at least two valves,
at least two hydraulic cylinders, where each hydraulic cylinder is in mechanical communication with the means at an attachment to the top portion of the means and an attachment to the bottom portion of the means where the hydraulic cylinder moves the bottom portion of the means in a linear vertical manner, wherein
each extension hose and each retraction hose is in fluid communication with the one of the at least two valves of the spool valve,
a return hose in fluid communication with the spool valve, and
a tank in fluid communication with the return hose; and
a control system configured to provided real time adjustment of the means, the control system comprising
a wireless controller configured to transmit a signal to a signal receiver,
a control unit having the signal receiver, the control unit in mechanical communication with the dump box, and
control lines, the control lines in electric communication with the control unit and the at least two valves of the spool valve.

9. The system of claim 8, wherein
the signal receiver of the control unit is configured to receive a signal from the wireless controller where the wireless controller is from 304.8 meters or less from the control unit.

10. The system of claim 8, wherein
the dumping system is used in connection with a roadway vehicle.

11. A dumping system for accurate and precise delivery of aggregate to a roadway track, the dumping system comprising:
a dump box configured to hold aggregate;
a dump gate, the dump gate comprising
at least three delivery gates, each delivery gate having a top portion, a bottom portion, and a flange, where each delivery gate is 0.66 meters in width; and
a frame, the frame in mechanical communication with each of the at least three delivery gates, and wherein the dump gate forms a fourth side of the dump box;
an operating system configured to move each of the at least three delivery gates between an open, a partially open, and a closed position, the operating system comprising
a pump configured to supply pressurized hydraulic fluid to the operating system, where the pump in fluid communication with a pressure hose,
the pressure hose, where the pressure hose is in fluid communication with a spool valve,
a spool valve having at least three valves,
at least three hydraulic cylinders, where each hydraulic cylinder is in mechanical communication with one of the at least three delivery gates at an attachment to the top portion and an attachment to the bottom portion where the hydraulic cylinder moves the bottom portion of the delivery gate in a linear vertical manner, each of the at least three hydraulic cylinders having an extension hose and a retraction hose, wherein
each extension hose and each retraction hose is in fluid communication with the one of the at least three valves of the spool valve,
a return hose in fluid communication with the spool valve, and
a tank in fluid communication with the return hose; and
a control system configured to provided real time adjustment of the at least three delivery gates between the open, the partially open, and the closed positions, the control system comprising
a wireless controller configured to transmit a signal to a signal receiver,
a control unit having the signal receiver, the control unit in mechanical communication with the dump box, and
control lines, the control lines in electric communication with the control unit and the at least three valves of the spool valve.

12. The system of claim 11, wherein
the signal receiver of the control unit is configured to receive a signal from the wireless controller where the wireless controller is from 304.8 meters or less from the control unit.

13. The system of claim 12, wherein
the bottom portion of each of the at least three delivery gates is 0.29 meters in height.

14. The system of claim 13, wherein
the top portion of each of the at least three delivery gates is 0.81 meters in height.

15. The system of claim 14, wherein
the top portion of each of the at least three delivery gates is from at least 1.9 centimeters in length; and
the bottom portion of each of the at least three delivery gates is from at least 1.9 centimeters in length.

16. The system of claim 15, wherein
the dumping system is used in connection with a roadway vehicle.

* * * * *

UNITED STATES PATENT AND TRADEMARK OFFICE
CERTIFICATE OF CORRECTION

| | |
|---|---|
| PATENT NO. | : 12,005,823 B2 |
| APPLICATION NO. | : 17/010543 |
| DATED | : June 11, 2024 |
| INVENTOR(S) | : Mark Robak and Tim Starostka |

It is certified that error appears in the above-identified patent and that said Letters Patent is hereby corrected as shown below:

In the Claims

In Column 11, Line 20 Claim 4 insert --gate-- after "the first delivery"

In Column 11, Line 27 Claim 6 change "a" to --the--

In Column 11, Line 56 Claim 8 delete "the" preceding "one"

In Column 12, Line 6 Claim 9 change "a" to --the--

In Column 12, Line 43 Claim 11 delete "the" preceding "one"

In Column 12, Line 62 Claim 12 change "a" to --the--

Signed and Sealed this
Tenth Day of September, 2024

Katherine Kelly Vidal
*Director of the United States Patent and Trademark Office*